(12) United States Patent
Chen et al.

(10) Patent No.: US 6,226,685 B1
(45) Date of Patent: May 1, 2001

(54) TRAFFIC CONTROL CIRCUITS AND METHOD FOR MULTICAST PACKET TRANSMISSION

(75) Inventors: Po-Yuan Chen, Tainan; Wei-Sung Wang, Taipei; Jui-Tse Lin, Hsinchu; Ruay-Yuan Lin, Chia Yi, all of (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 09/203,581

(22) Filed: Dec. 2, 1998

(30) Foreign Application Priority Data

Jul. 24, 1998 (TW) ................................................ 87112115

(51) Int. Cl.⁷ ................................................ G06F 15/173
(52) U.S. Cl. .......................................... 709/238; 370/390
(58) Field of Search .................................... 370/390, 392, 370/396, 399, 416; 709/245, 249, 250, 238, 244

(56) References Cited

U.S. PATENT DOCUMENTS

| | | | |
|---|---|---|---|
| 5,107,457 | 4/1992 | Hayes et al. | 711/132 |
| 5,136,584 | * 8/1992 | Hedlund | 370/399 |
| 5,274,642 | 12/1993 | Widjaja et al. | 370/411 |
| 5,361,372 | 11/1994 | Rege et al. | 709/234 |
| 5,406,556 | 4/1995 | Widjaja et al. | 370/381 |
| 5,432,908 | 7/1995 | Heddes et al. | 711/147 |
| 5,528,588 | 6/1996 | Bennett et al. | 370/396 |
| 5,701,437 | 12/1997 | Kinjo et al. | 711/162 |
| 5,732,087 | * 3/1998 | Lauer et al. | 370/416 |
| 5,757,795 | * 5/1998 | Schnell | 370/392 |
| 5,923,654 | * 7/1999 | Schnell | 370/390 |
| 6,101,187 | * 8/2000 | Cukier et al. | 370/396 |

* cited by examiner

Primary Examiner—Zarni Maung
Assistant Examiner—Patrice Winder
(74) Attorney, Agent, or Firm—McDermott, Will & Emery (57) ABSTRACT

A control circuit and method for managing multicast packets is implemented in a network switch to improve the efficiency of bandwidth utilization. The control circuit comprises an internal control buffer which is subdivided into multiple storage sections. Each storage section consists of buffer-control records including valid bit, counter value, control pointer, and tag number. When the tag number of a coming multicast packet indicates that the internal control buffer is full, the control data of the coming multicast packet will be copied to an external control memory. On the other hand, the control data of the coming multicast packet will be directly stored in the control buffer if otherwise. After each multicast packet transmission, the control data in the control buffer can be accessed and updated. Consequently, the traffic between the network switch and the external memories can be reduced to the minimum, thereby to improve the efficiency of the bandwidth utilization.

17 Claims, 6 Drawing Sheets

| Tag number | Valid bit | Counter value | Control pointer |
|---|---|---|---|
| 0 | 1 | | |
| 1 | 0 | | |
| 2 | 0 | | |
| | | | |
| N | 0 | | |

TRAFFIC CONTROL CIRCUITS AND METHOD FOR MULTICAST PACKET TRANSMISSION

BACKGROUND OF THE INVENTION

A. Field of the Invention

The present invention relates to a traffic control circuit and method for multicast packet transmission, especially to a traffic control circuit and method in a network switch for reducing the traffic between the network switch and the external memories, thereby to utilize the network bandwidth more efficiently.

B. Description of the Prior Art

Figure 1:
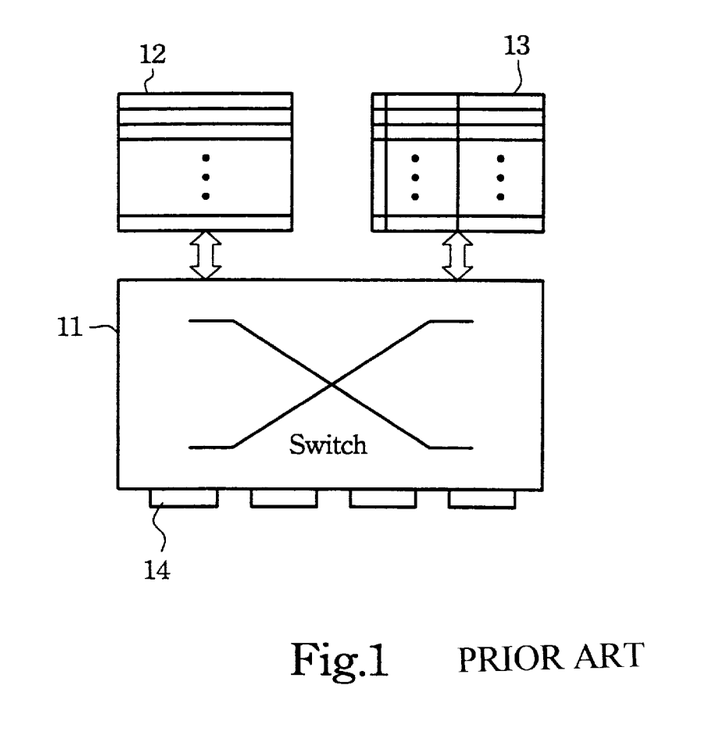
FIG. 1 is a schematic diagram showing the architecture of a conventional network switch based on the approach of "copy of packets".

It is estimated that more than ten percent of the traffic in the Internet is occupied by the multicast packets, including broadcast packets. A conventional approach to process the traffic caused by the multicast packets is called "copy of packet memory". Refer to FIG. 1, the approach of "copy of packet memory" replicates the coming packets in a packet memory 12 and stores control data in a control memory 13. The number of packets and control data copied depends on the number of ports to be transferred. The network switch 11 will send a request for transmission to each output port 14. The output port 14 of the network switch 11 will transfer a multicast packet from the packet memory 12 in response to its corresponding control data stored in the control memory 13. After the transmission is complete, the memory space of the packet memory 12 and of the control memory 13 will be released. This approach is very straightforward and easy to implement. Nevertheless, it may cause lots of traffic between the network switch 11 and the external memories, especially the packet memory 12 and the control memory 13.

Figure 2:
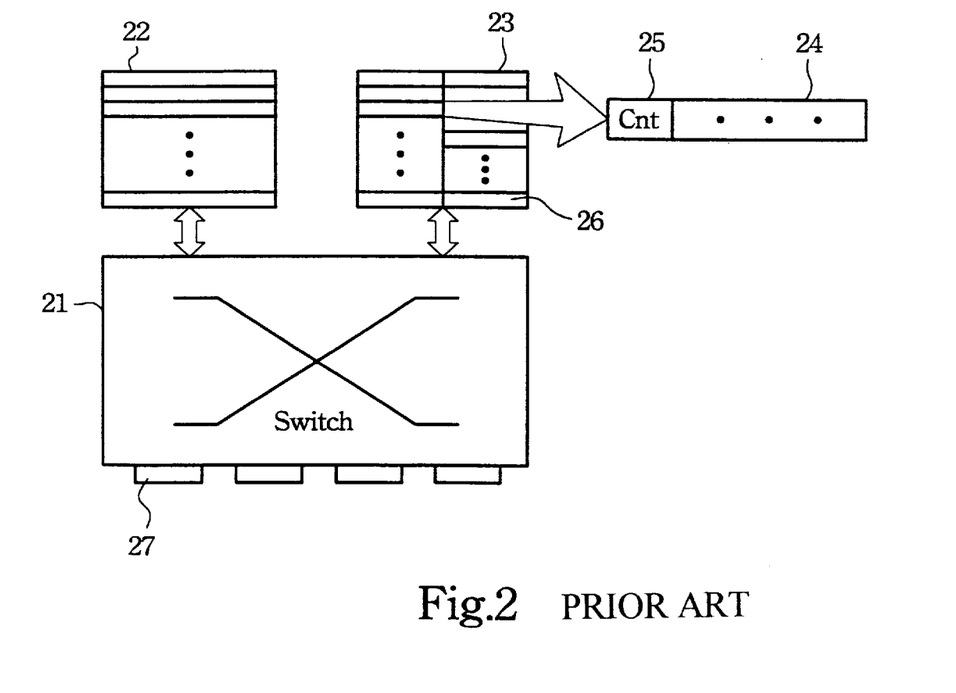
FIG. 2 is a schematic diagram showing the architecture of a conventional network switch based on the approach of "copy of control data".

Another approach is called "copy of control memory". Refer to FIG. 2 for an exemplary implementation based on this approach. The network switch 21 has multiple output ports 27 for transferring packets to their destination addresses. When a multicast packet arrives, one copy of the multicast packet will be stored in the packet memory 22. The control data for each copy of multicast packets will then be stored in the control memory 23.

The control data stored the control memory 23 includes: a packet memory link list 24, a counter 25, a control pointer of a output port (or descriptor) 26. The network switch 21 will replicate the control pointer of an output port 26 to the control memory of the output port in response to the message of the forwarding port. The multicast packets stored in the packet memory 22 will not be transmitted by those output ports until the output port 27 receives a control pointer. The counter 25 is for recording the number of times for packet transmission. The output port 27 sends a copy of the multicast packet stored in the packet memory 22 to its forwarding port according to its control data stored in the control memory 23. After each packet is sent, its memory space in the control memory 23 will be released. The value of counter 25 value will also be updated. Nevertheless, its memory space in the packet memory 22 will not be released until the counter 25 expires.

Apparently, the approach of "copy of control memory" can save more network bandwidth than the approach of "copy of packet memory" because only one copy of the multicast packet is stored in the packet memory 22. Moreover, the multicast packet in the packet memory 22 will not be transferred to the output port 27 until the output port 27 receives a control pointer of the multicast packet. However, this approach is more difficult to implement than the previous one. Moreover, it may result in the insufficient bandwidth of the control memory 23.

There are several other approaches trying to improve the bandwidth of the networks. For instance, U.S. Pat. No. 5,701,437, "Dual-Memory Managing Apparatus and Method Including Prioritization of Backup and Update Operations", discloses a dual-memory managing apparatus which is connected to multiple memories and processors through a data bus such that identical data are stored in the multiple memories. The invention can prevent the degradation of processing capability of the apparatus in a memory copy mode.

In another patent, U.S. Pat. No. 5,432,908, "High Speed Buffer Management Of Share Memory Using Linked Lists And Plural Buffer Circuits For Processing Multiple Requests Concurrently", involves in using a memory which is large and fast for controlling and managing the data in the buffer, thereby to speed up the network communication speed.

On the other hand, as to the hardware controls over the buffers and stacks, U.S. Pat. No. 5,107,457, "Stack Data Cache Having A Stack Management Hardware With Internal And External Stack Pointers And Buffers For Handling Underflow And Overflow Stack", uses a stack management to control the overflow and underflow of the stack, thereby to improve the efficiency of the stacks.

Consequently, all of the above mentioned patents intend to improve the network bandwidth either by increasing the memory size, or the speed of the memory buffer, or even using fast cache memory. Basically, their improvements are based on adding additional hardware elements to achieve a desired effect with the trade-off of additional cost.

SUMMARY OF THE INVENTION

Accordingly, it is an object of the present invention to provide a traffic control circuit and method for a network switch which involves in implementing and managing an internal control buffer in the network switch integrated circuit (hereinafter referred to as "IC") for processing multicast packets in advance, thereby to reduce the traffic between the network switch and the external memories.

It is another object of the present invention to provide an efficient traffic control circuit and method for a network switch which can utilize the bandwidth between the network switch and the external memories more efficiently without much of extra cost.

It is still a further object of the present invention to provide a traffic control circuit and method for a network switch which can increase the transmission speed of the multicast packets and prevent the memory bus from overloading by managing an internal control buffer in the network switch IC.

It is known that the bottleneck of the current network technology is caused by the insufficient memory space of the network switch. There are several approaches to solve this problem, such as increasing the memory data size, or increasing the speed of the memory bus with equally fast memory speed, or directly adopting a memory with fast access speed. These approaches cannot avoid extra hardware cost and implementation for the improvement in traffic control. For this reason, the present invention intends to provide an efficient and yet low-cost traffic control circuit and method for the network switch to improve the traffic flow between the network switch and the external memories.

The preferred embodiment of the present invention involves in managing an internal control buffer for storing the control data of the multicast packets, including counter, tag number, binary valid bit and control pointer for the multicast packets. The internal control buffer is subdivided into multiple storage sections. Each storage section contains the control data for a multicast packet. When the internal control buffer is full, the control data of the multicast packets must be transferred to an external control memory. On the other hand, if the internal control buffer still has room, the control data of a coming multicast packet will be transferred to the internal control buffer. As a result, the traffic flow between the network switch and the external memories can be reduced to the minimum.

Moreover, the present invention also provides the implementation of a tag generator for generating a tag number indicating available storage sections in the internal control buffer. Then, the control data of each multicast packet will be written into an available storage section of the internal control buffer indicated by the tag number.

The method of the invention preferably includes the steps of: first, store each coming multicast packet in a packet memory external to a network switch IC. Then, generate a tag number for the coming multicast packet. From the tag number generated for the coming multicast packet, determine if the tag number is equal to a default tag number. If yes, store the control data of the multicast packet to a control memory external to the network switch. If not, store the control data of the coming multicast packet to an available storage section of the internal control buffer indicated by the tag number.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is exemplary. Those skilled in the art will appreciate that changes can be made to the disclosed embodiment without departing from the spirit and scope of the invention.

In general, a control memory takes four kinds of requests including: request for packet memory link list, request for multicast counter, request for all-ports descriptor link list, and request for per-port descriptor link list. Among these requests, the easiest part to implement for improvement is in the request for multicast counter. For this reason, the present invention will target on the request for multicast counter to improve the bandwidth between the network switch IC and the external memories, especially the control memory.

Figure 3:
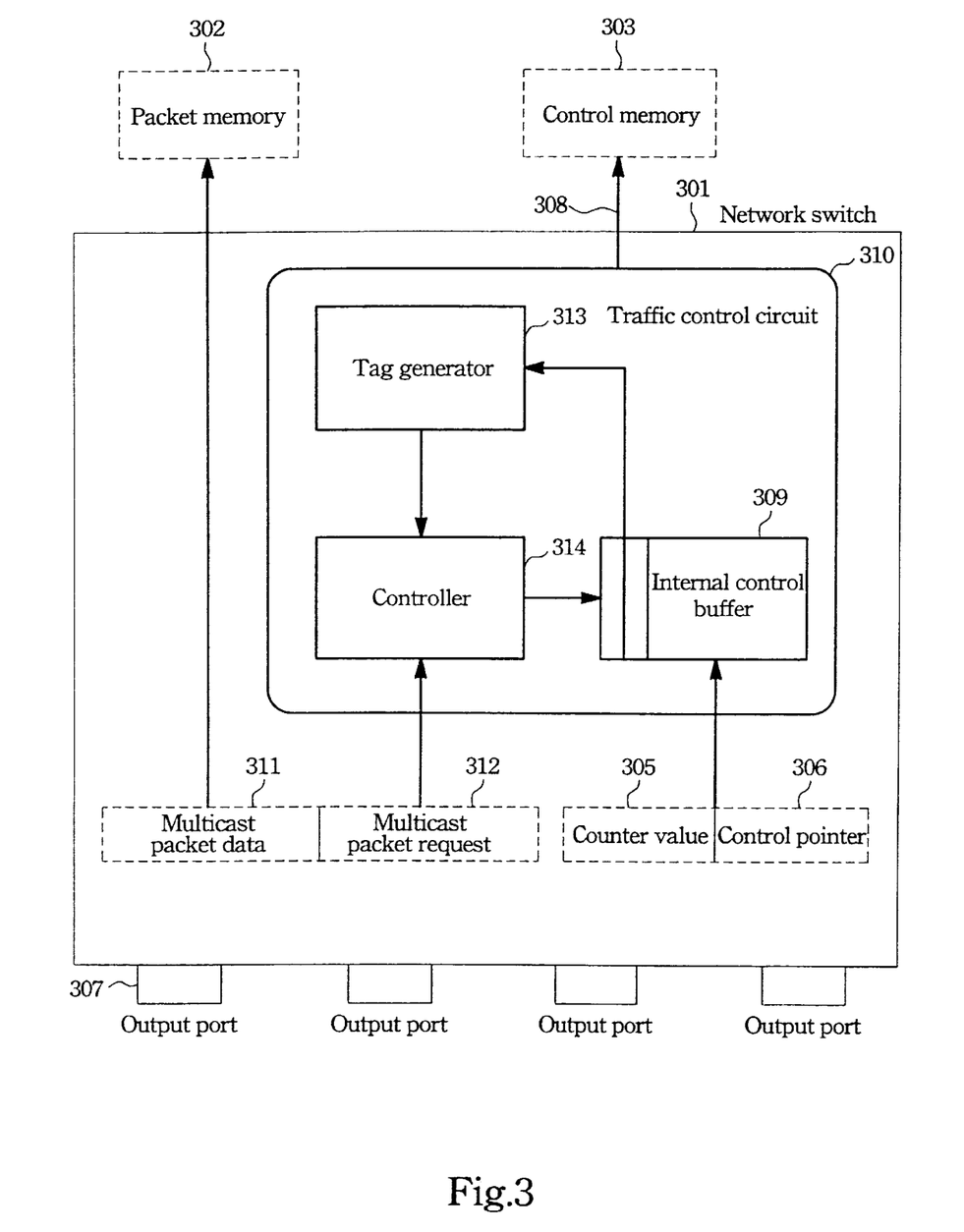
FIG. 3 is a schematic diagram showing the architecture of a network switch for processing the multicast packets according to the preferred embodiment of the present invention.

The architecture of the preferred embodiment of the present invention is shown in FIG. 3. The traffic control circuit 310 is implemented in the network switch 301 for processing multicast packets. The traffic control circuit 310 includes an internal control buffer 309, a tag generator 313, and a controller 314. The internal control buffer 309 has multiple storage sections for storing the control data of the multicast packets. When the multicast packets are sent to the network switch 301 via the output port 307, the multicast packet data 311 are directly stored in the packet memory 302. Upon receiving a multicast packet, the network switch 301 will generate a control pointer 306 and a counter value 305 for the coming multicast packet and then send a multicast packet request to the traffic control circuit 310.

After the traffic control circuit 310 receives the multicast packet request 312, the controller 314 determines if the tag number generated by the tag generator 313 for the coming multicast packet is equal to the default tag number. If yes, the controller 314 will output a control signal (not shown) to enable the control memory 303 and store the counter value 305 in the control memory 303 indicated by the control pointer 306. If not, the controller 314 outputs a control signal to enable the internal control buffer 309 to store the counter value 305 and the control pointer 306 in a storage section of the internal control buffer 309 indicated by the tag number generated by the tag generator 313 and then set its corresponding valid bit to "1" in the internal control buffer 309.

Upon receiving a multicast packet, the network switch 301 replicates the control data of the coming multicast packet to the control memory 303 of a target output port and then notify the output port 307. The output port 307 reads the packet data from the packet memory 302 and transfers the packet data in response to the control data of the control memory 303. After the transmission is complete, the output port 307 will inform the traffic control circuit 310.

Then, the controller 314 determines if the tag number of the coming multicast packet is equal to a default value. When the tag number of the coming multicast packet is equal to a default tag number, the counter value of the coming multicast packet in the control memory 303 will be updated by increasing/decreasing its value. If not, the counter value of the coming multicast packet in the internal control buffer 309 will be updated instead. When the counter value is expired, the memory space occupied the packets in the internal control buffer 309 or the control memory 303, and the packet memory 302, will all be released.

Consequently, whenever a packet arrives and if the packet is a multicast packet, the packet data of the multicast packet will be stored in the packet memory 302 while its counter value 305 and control pointer 306 will be stored in the internal control buffer 309. After all the output ports transmitted the multicast packets, the network switch 301 can access and update the counter value in the internal control buffer 309 directly without having to access the control memory 303. On the other hand, the counter value 305 will be written into the control memory 303 via the memory bus 308 only when the internal control buffer 309 is full. To detect if the internal control buffer 309 is full, the data format of the internal control buffer 309 is illustrated in FIG. 4.

Figure 4:
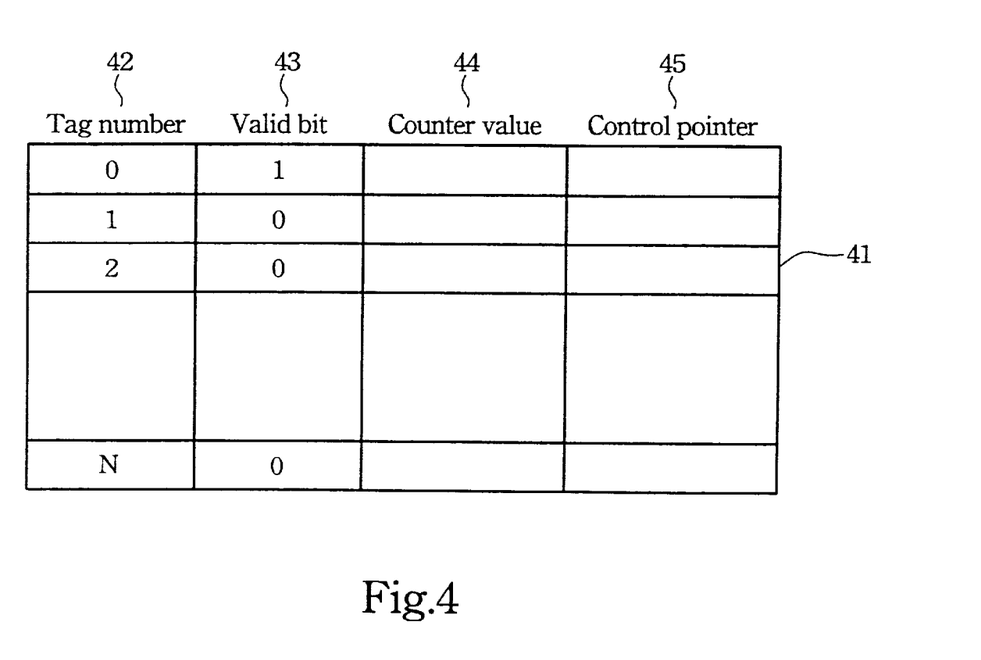
FIG. 4 is a schematic diagram showing the data format of the control buffer according to the preferred embodiment of the present invention.

Refer to FIG. 4, the internal control buffer 309 is subdivided into multiple storage sections. Each storage section contains buffer-control records including tag number 42, valid bit 43, counter value 44 and control pointer 45. The tag number 42 indicates the section number of the internal control buffer 309. Whenever the network switch 301 receives a multicast packet, the tag generator 313 will generate a tag number based on the valid bit 43 and tag number 42 of the internal buffer 309 for the coming multicast packet if the internal control buffer 309 is not full yet. The control data of the coming multicast packet will be stored in the internal control buffer 309 instead. If the internal control buffer 309 is full, the tag generator 313 will assign a default tag number ranging from zero to N to the coming multicast packet, where "N" is equal to $2^k-1$ and k is determined on the depth of the internal control buffer 309. The valid bit indicates if the storage section of the internal control buffer 309 is available. For instance, a network switch having 4 output ports will have 15 memory locations in the internal control buffer 309. The tag value for such network switch will range from 0 to 14. In such case, "N" will be equal to 15 to represent the depth of the internal control buffer 309 and indicate that the internal control buffer 309 is full.

The binary valid bit 43 indicates that if the corresponding storage section of the internal control buffer 309 is in use. If the memory location is in use, then the valid bit 43 is set to "1", otherwise the valid bit will be set to "0". The counter value 44 indicates the number of transmission times for the coming multicast packet. The counter value 44 will increase/decrease upon each packet transmission. The control pointer 45 indicates the offset of the packet memory 22 for the coming multicast packet. According to the buffer-control records stored in each section of the internal control buffer 309 as illustrated in FIG. 4, the present invention can efficiently manage the traffic flow of the multicast packet transmission.

Refer to FIG. 3 again for the tag generator 313. The tag generator 313 looks up the storage section available in the internal control buffer 309 by the indication of the valid bit (except the default value) and outputs a tag number indicating an empty storage section in the internal control buffer 309. The detailed preferred embodiments of the tag generator 313 are illustrated in FIG. 5 and FIG. 6.

Figure 5:
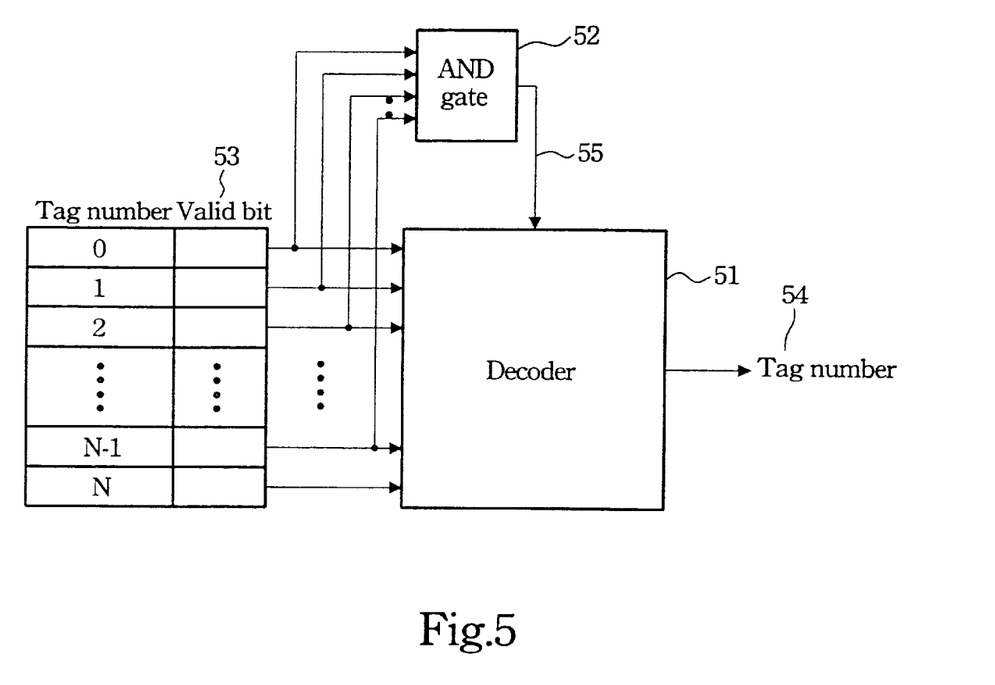
FIG. 5 is a schematic diagram showing the architecture of the preferred embodiment of the tag generator.

Refer to FIG. 5, the AND gate 52 can find the available storage sections of the internal control buffer 303 by connecting to the valid bit record 53 of each storage section of the internal control buffer 303 (except the valid bit of the default tag number). The AND gate 52 will generate a control signal 55 to a decoder 51 in response to the connections of the valid bit record 53 of each storage section. The decoder 51 will output a tag number 54 in response to the control signal 55. When the control signal 55 of the AND gate 52 outputs a "0", the decoder 51 will generate a tag number 54 which indicates a storage section having a valid bit record of "0". On the other hand, when the control signal 55 is equal to "1", it indicates that there is no empty storage section in the internal control buffer 309. In such case, the decoder 51 will generate the default tag number as the tag number 54 for the coming multicast packet.

Figure 6:
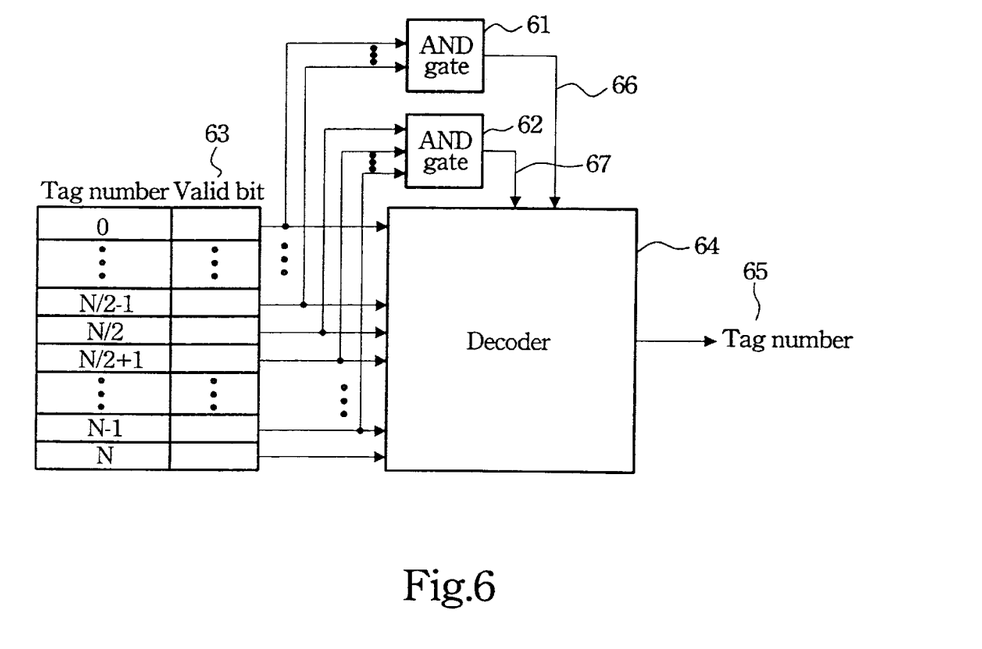
FIG. 6 is a schematic diagram showing the architecture of another preferred embodiment of the tag generator.

The other embodiment of the tag generator is illustrated in FIG. 6. If the internal control buffer is very large, which indicates that the tag number will also be very large, the architecture of the tag generator 313 can be designed similar to a binary search to speed up the search speed. The valid bit record 63 can be divided into two parts (not including the valid bit of the memory location indicated by the default tag number), each part connecting to AND gate 61 and AND gate 62 respectfully. The AND gate 61, and AND gate 62 generate control signals 66, 67 respectively to the decoder 64. The decoder 64 will find an available storage section of the internal control buffer 309 in response to the control signals 66 and 67. If one of the control signals 66, 67 generated by the AND gate 61 and AND gate 62 contains a "0", then the decoder 64 outputs a tag number 65 indicating an available storage section in the internal control buffer 309. On the other hand, if the control signals 66 and 67 of the AND gate 61, and AND gate 62 are both "1", it indicates that there is no empty storage section in the internal control buffer 309. In such case, the decoder 64 will output a default tag number as the tag number 65 for the coming multicast packet.

Figure 7:
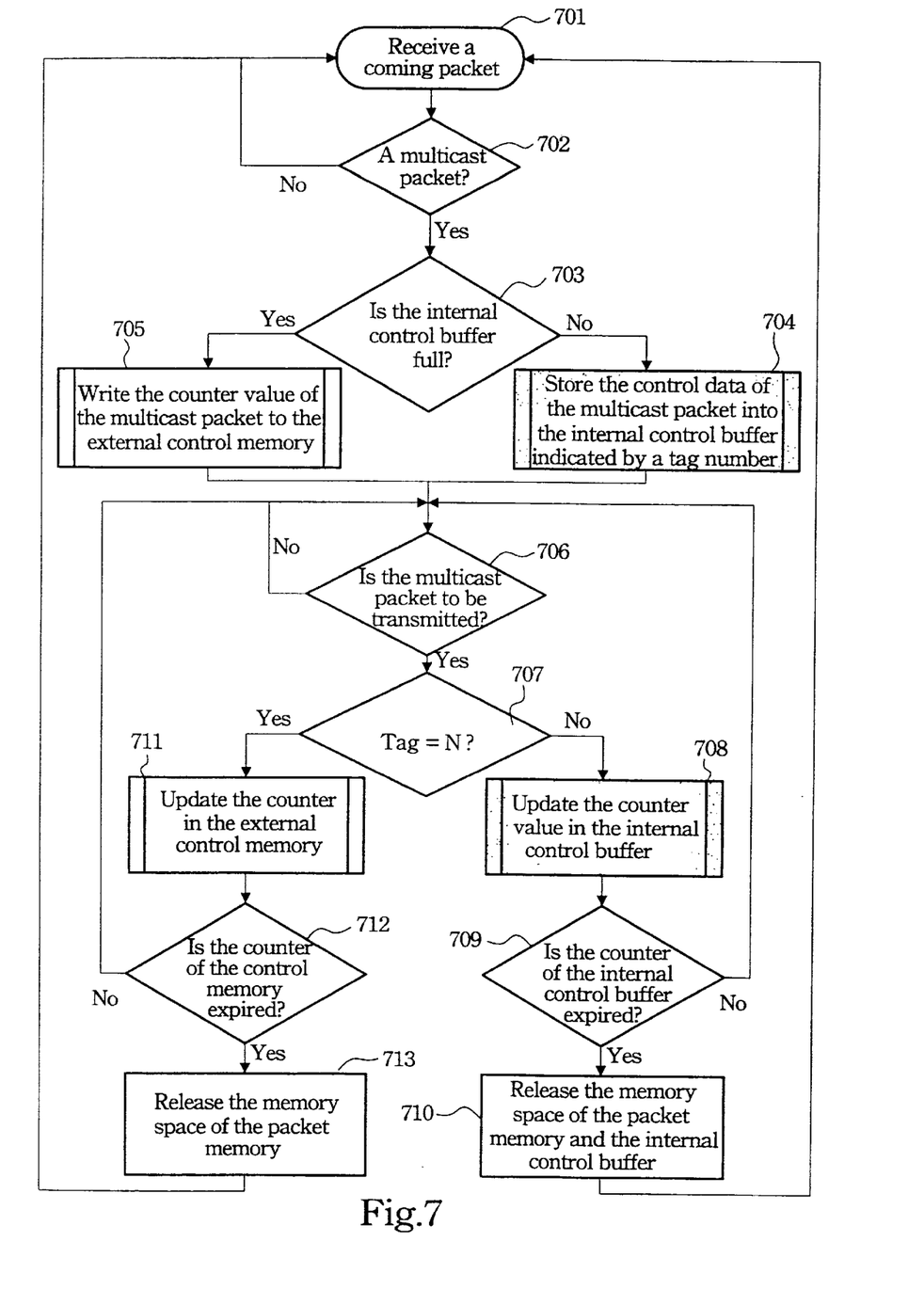
FIG. 7 is a flow chart showing the method of the present invention.

The process of the traffic control circuit upon receiving incoming packets is illustrated in FIG. 7. Step 701, the traffic control circuit receives a coming packet. Step 702, the traffic control circuit determines if the coming packet is a multicast or broadcast packet. If yes, go to step 703. If not, return to step 701 to receive coming packets. At step 703, the traffic control circuit determines if the internal control buffer is full according to the tag number assigned for the multicast packet. If yes, go to step 705. Otherwise, go to step 704.

At step 704, store the control data of the multicast packet into the internal control buffer indicated by the tag number of the multicast packet and reset the valid bit of the corresponding storage section to "1". At step 705, since the internal control buffer is full, so write the counter value of the coming multicast packet to the external control memory instead of the internal control buffer.

At step 706, determine if the multicast packet is to be transmitted. If yes, go to step 707. Otherwise, return to step 706 to keep checking if the multicast packet is to be transmitted. Step 707, determine if the tag number of the multicast packet is equal to "N"? If yes, that means the internal control buffer is full, so go to step 711. If not, go to step 708.

At step 708, the control data of the multicast packet is written to the control memory of the target output port. When the target output port receives the control data, it sends the multicast packet from the packet memory. Then, the counter for the internal control buffer is increased/decreased for updating the number of times for packet transmission. Then, go to step 709 to determine if the counter is expired. If the counter is expired, it means that the packets have all been sent. So, at step 710, release the memory space of the packet memory and the internal control buffer. Then, go back to step 701. If the counter is not expired yet, go to step 706 to check if there is any multicast packet waiting to be transmitted.

At step 711, since the tag number of the multicast packet is equal to the default tag number, so the counter value of the multicast packet must locate in the external control memory. In such case, the control pointer of the multicast packet will be replicated to the control memory of the target output port according to the information about the forwarding output port. When the target output port receives the control pointer, the data stored in the packet memory will be transmitted to the target output port. Accordingly, the counter of the control memory will be updated by increasing or decreasing its value. Then, go to step 712 to determine if the counter for the control memory is expired. If yes, go to step 713, otherwise return to step 706.

At step 713, since the counter is expired, it indicates that all packets in the packet memory have been transmitted. So, the memory space of the packet memory can be released.

To sum up, the present invention uses traffic control circuits in the network switch IC to process multicast packets in advance so that the traffic between the network switch and the external memory can be reduced in a great deal. The invention can also efficiently improve the traffic flow and save extra hardware cost. Moreover, based on the tag generator of the present invention, the results of the improvement will be shown more apparently as the number of output ports increases.

It should be understood that various alternatives to the structures described herein might be employed in practicing the present invention. It is intended that the following claims define the invention and that the structure within the scope of these claims and their equivalents be covered thereby.

What is claimed is:

1. A control circuit in a network switch for multicast packet transmission, comprising:
    an internal control buffer subdivided into a plurality of storage sections for storing a plurality of buffer-control records each comprising a control pointer, a counter value, an addressing tag number, and a valid bit for each coming multicast packet;
    addressing tag generating means for generating said addressing tag number for each coming multicast packet in response to said addressing tag number and said valid bit stored in each storage section of said internal control buffer; and
    control means for determining if said counter value and said control pointer of said coming multicast packet is to be stored in one of said storage sections of said internal control buffer according to said addressing tag number generated by said addressing tag generating means upon receiving a multicast packet request, and transmitting said multicast packet, that is found by accessing said addressing tag number and said control pointer, to a plurality of output ports, wherein said counter value indicates the number of transmission times for said coming multicast packet.

2. The control circuit as claimed in claim 1, wherein said counter value is updated by increasing or decreasing its value for recording number of transmit times for the multicast packet.

3. The control circuit as claimed in claim 1, wherein said control means sends said counter value and said control pointer of said coming multicast packet to a memory external to said network switch when said addressing tag number generated by said addressing tag generating means is equal to a default addressing tag number.

4. The control circuit as claimed in claim 3, wherein said control means enables said internal control buffer to store said counter value and said control pointer of said multicast packet in the storage section of said control buffer indicated by said addressing tag number, and simultaneously resets said valid bit of said storage section if said addressing tag number is not equal to said default addressing tag number.

5. The control circuit as claimed in claim 1, wherein said addressing tag generating means comprises:
    an AND gate coupling to each valid bit record in each storage section of said control buffer for generating a control signal indicating an available storage section in said control buffer; and
    a decoder coupling to each addressing tag number record of each storage section of said control buffer for generating an addressing tag number in response to said control signal.

6. The control circuit as claimed in claim 5, wherein said addressing tag number generated by said decoder indicates an available storage section of said control buffer when said addressing tag number is not equal to a default addressing tag number.

7. The control circuit as claimed in claim 5, wherein said addressing tag number generated by said decoder indicates said control buffer is full when said address tag number is equal to said default addressing tag number.

8. The control circuit as claimed in claim 5, wherein said valid bit record of each storage section is reset to a binary zero when said storage section is empty and to a binary one if said storage section is occupied.

9. The control circuit as claimed in claim 1, wherein said addressing tag generator comprises:
    a first AND gate coupling to half of said valid bit records of said storage section of said control buffer for generating a first control signal determining the status of each storage section in said half of said control buffer;
    a second AND gate coupling to the other half of said valid bit records of said storage section of said control buffer for generating a second control signal determining the status of said storage section in said other half of said control buffer; and
    a decoder coupling to each addressing tag number record of each storage section of said control buffer for generating an addressing tag number in response to said first and second control signal.

10. The control circuit as claimed in claim 9, wherein said addressing tag number generated by said decoder indicates an available storage section of said control buffer when said addressing tag number is not equal to said default addressing tag number.

11. The control circuit as claimed in claim 9, wherein said addressing tag number generated by said decoder indicates said control buffer is full when said addressing tag number is equal to said default addressing tag number.

12. A method for processing multicast packets in a network switch comprising the steps of:
    storing a coming multicast packet in a packet memory external to said network switch;
    generating a control pointer and a counter value for said multicast packet in response to a request of said coming multicast packet;
    generating an addressing tag number for said coming multicast packet by an addressing tag generating means, wherein said addressing tag number indicates an available storage section of an internal control buffer which is subdivided into a plurality of storage sections;
    determining if said addressing tag number of said coming multicast packet is a default addressing tag number;
    storing said counter value of said coming multicast packet in an external control memory indicated by said control pointer of said coming multicast packet when said addressing tag number of said coming multicast packet is equal to said default tag number;
    storing said control pointer and said counter value of said coming multicast packet in a storage section of said internal control buffer indicated by said addressing tag number when said addressing tag number of said coming multicast packet is not equal to said default addressing tag number; and
    transmitting said coming multicast packet, that is found by accessing said addressing tag number and said control pointer, to a plurality of output ports, wherein id counter value indicates the number of transmission times for said coming multicast packet.

13. The method as claimed in claim 12, wherein said storage section of said control buffer comprises a plurality of buffer-control records each comprising said counter value, said control pointer, said addressing tag number and a valid bit.

14. The method as claimed in claim 13, further comprising the steps of:
  resetting said valid bit record to a binary one when said storage section of said internal control buffer is not empty; and
  resetting said valid bit record to a binary zero when said storage section of said control buffer is empty.

15. The method as claimed in claim 12, wherein said step of transmitting said multicast packet further comprising the steps of:
  determining if said addressing tag number of said multicast packet is equal to said default addressing tag number every time when each output port of said network switch transmits one of said multicast packets;
  updating said counter value of said transmit multicast packet in said control memory when said addressing tag number of said transmit multicast packet is equal to said default addressing tag number; and
  updating said counter value of said transmit multicast packet in said storage section of said internal control buffer when said addressing tag number of said transmit multicast packet is not equal to said default addressing tag number.

16. The method as claimed in claim 15, wherein said step of updating said counter value is by increasing or decreasing its counter value.

17. The method as claimed in claim 15 further comprising the steps of:
  releasing said memory space of said packet memory and said storage section of said internal control buffer related to said counter value when said counter value of said control buffer is expired; and
  releasing said memory space of said packet memory and said storage section of said external control memory related to said counter value when said counter value of said control memory is expired.

* * * * *